Aug. 30, 1960    D. RUBENSTEIN    2,951,001
DECORATIVE STRUCTURAL ELEMENT
Filed Jan. 12, 1956    2 Sheets-Sheet 1
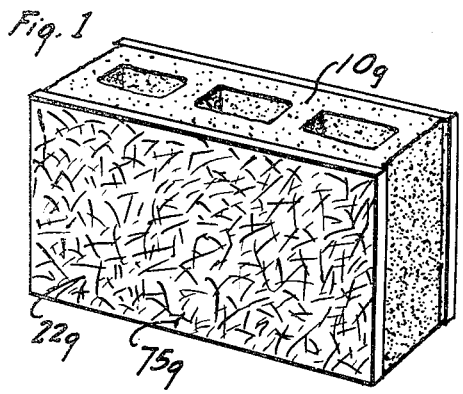
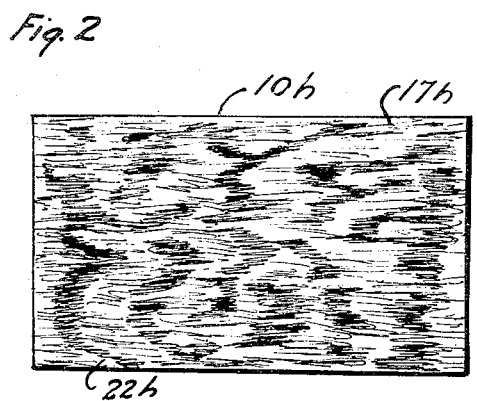
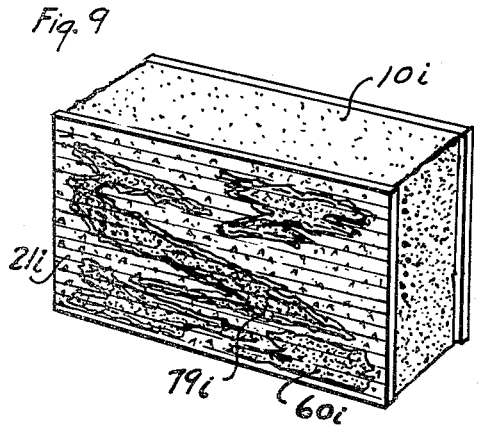
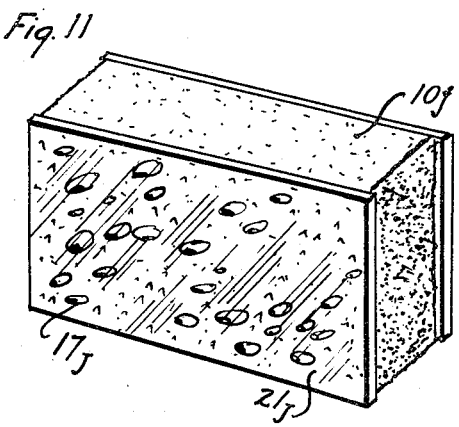
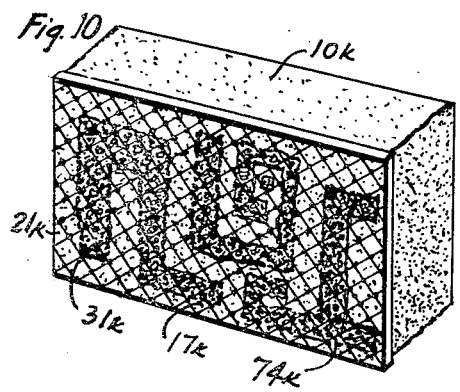
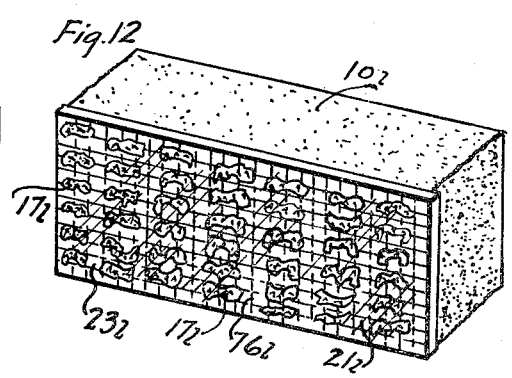
INVENTOR.
BY David Rubenstein Aug. 30, 1960 D. RUBENSTEIN 2,951,001
DECORATIVE STRUCTURAL ELEMENT
Filed Jan. 12, 1956 2 Sheets-Sheet 2
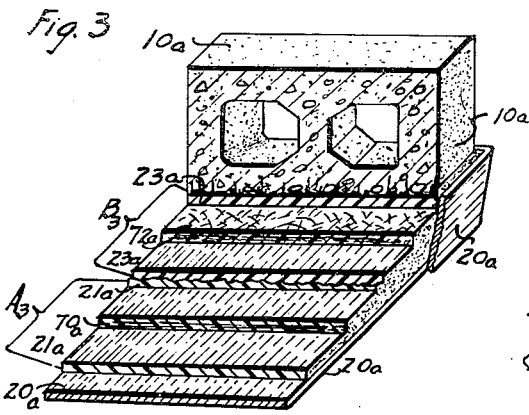
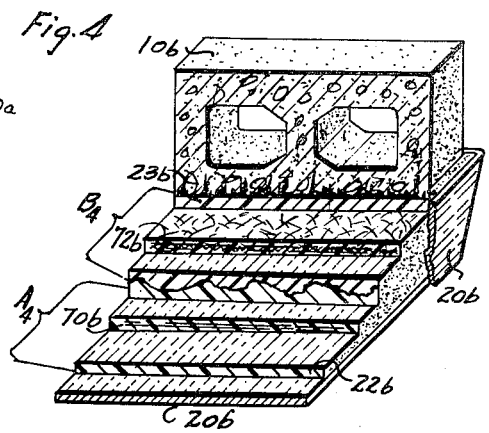
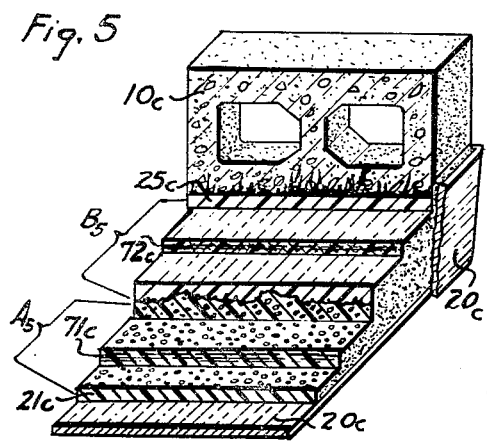
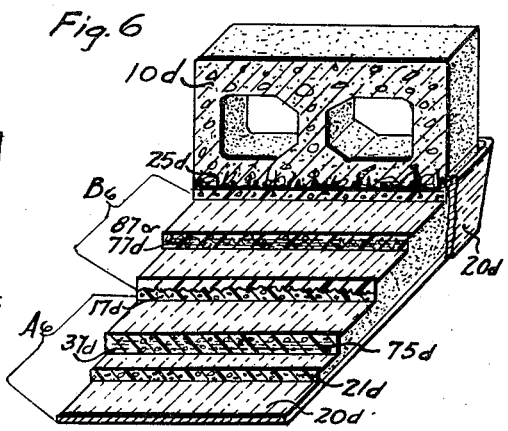
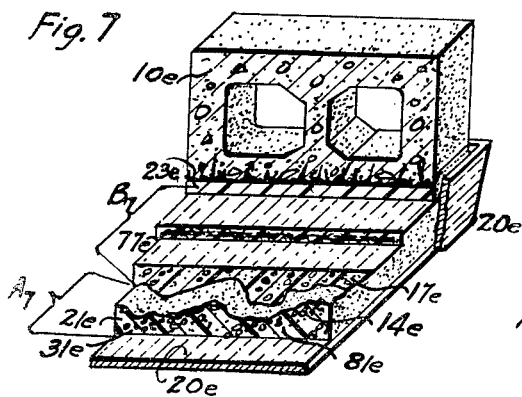
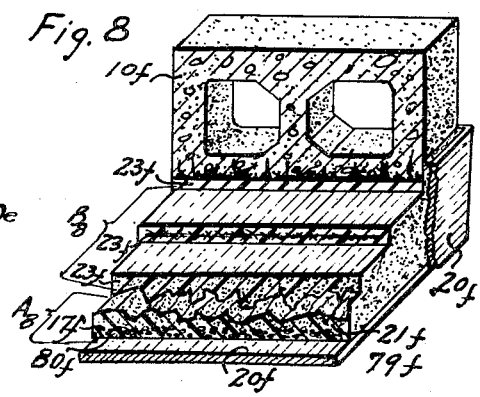
INVENTOR.
BY David Rubenstein

United States Patent Office 2,951,001
Patented Aug. 30, 1960

2,951,001
DECORATIVE STRUCTURAL ELEMENT

David Rubenstein, 2750 2nd Ave., San Diego 3, Calif.

Filed Jan. 12, 1956, Ser. No. 558,772

19 Claims. (Cl. 154—45.9)

This invention relates to decorative structural building members.

This application is a continuation-in-part of my pending application Serial No. 498,715, filed April 1, 1955, which in turn is a continuation-in-part of applications Serial No. 345,084, filed March 27, 1953; Serial No. 340,642, filed January 16, 1953; Serial No. 267,167, filed December 17, 1951 (now Patent No. 2,671,158); and Serial No. 229,852, filed June 4, 1951 (now Patent No. 2,850,890).

An object of my invention as presented in this application is to provide structural members with novel decorative quality. Another object is to provide such members which, while having a unity or compatibility of decorative character when used in the same structure, yet have such pleasing and irregular variations as to provide interest and character in the surface.

Another object is to provide structural members with a controlled surface texture or polish by a molded plastic layer, but with decorative character provided by reinforcing material and/or filler. Color or colors may be systematically or irregularly incorporated into the plastic composition independently of such decorative character or the filler or reinforcing materials may be colored.

Another object of my invention is to provide a decorative surface of the plastic in which scratches or small cuts are masked or blended into the surface appearance of the plastic layer.

It is possible to assemble my invented structural members with plastic layers of different colors or finishes into innumerable aesthetically pleasing patterns or combinations.

In my copending application Serial No. 229,852, filed June 4, 1951, of which this application is a continuation-in-part I disclose the method of manufacturing prestressed masonry and concrete constructions and the structural components therefor which provides a means to chemically prestress precast blocks, units and structural components of the said concrete or masonry constructions. The method provides the prestressing of prestressed preloads into concrete blocks, slabs or any other adaptable member designed for loading in tension, compression, shear or tension, by the shrinking, condensing, tightening action which introduces prestress preloads into the concrete or other masonry material as the materials of the lamination undergo setting, cooling, solidification, chemical reaction, shrinking, condensing and unification with the preformed or precast concrete components, blocks, units or structural members. The surface layer constructions of the present invention together with body layer constructions provides multi-purpose features and end uses obtained by the disclosures shown herein providing architectural, esthetic and decorative features useful in the concrete and masonry constructions having prestressed preloads.

The invention here claimed may advantageously be used in conjunction with the inventions, articles, and the methods of making the same which have been discussed and claimed in my preceding copending applications, of which this is a continuation-in-part.

Although in the accompanying drawings I have shown preferred embodiments of my invention and have described the same and modifications thereof in this specification, it is to be understood that these are not intended to be either exhaustive or limiting of the invention, but on the contrary, are chosen for the purpose of illustrating the invention in order that others skilled in the art may so fully understand the invention, its principles and the application thereof, that they may embody it and adapt it in numerous forms, each as may be best suited to the requirements of its particular use.

In the drawings:

Figure 1 is an isometric view of a concrete block coated with a plastic reinforcing layer with a weblike pattern in the surface coating, said pattern resulting from the use of a fiberglass mat as a reinforcing component in the plastic layer.

Figure 2 is a front elevation view of a structural member such as a concrete block, coated with a distinctive plastic layer finish.

Figure 3 is an enlarged partial cross-section of an embodiment of the invention (the layers shown are thicker than usually used and as shown are for clearly illustrating the layer features of the invention);

Figure 4 is another embodiment of the invention shown in the manner of Figure 3;

Figure 5 is another embodiment of the invention showing another decorative means;

Figure 6 is another embodiment of the invention showing filler decorative means;

Figure 7 is another embodiment of the invention showing pellucid facing layer having decorative filler features;

Figure 8 is another embodiment of the invention showing pellucid facing layer having other filler decorative means;

Figure 9 is an isometric view of a concrete block having a surface layer construction and a body layer construction with contrasting features;

Figure 10 is an isometric view of a porous structural body having a surface layer with fibrous and metallic embodiments thereof;

Figure 11 is another isometric view of a porous structural body having a surface construction layer and a body layer embodying other features of this invention;

Figure 12 is an isometric view of a porous structural body having a surface layer construction and features of this invention.

One example of my invention is shown in Figures 1 and 3, wherein a concrete block 10 is coated with a plastic layer. A transparent, or highly pellucid translucent, polyester-type resin composition is applied on a non-porous surface of a mold pan, said mold pan being slightly larger than the porous body to which a plastic layer is to be applied. (By "pellucid" I mean capable of passing light, whether with distortion—translucent, or without it—transparent.) A loose, diaphanous, fiberglass mat 70, or synthetic resin fiber mat or veil, or both fiberglass in any form and veil, cut to fit into the mold pan 20 and blanket the bottom of the pan, is embedded in the resin 21 contained in the mold pan. A mat of fiber which will be visible in the resin is settled, or carefully worked, into the facing layer A, exercising care to avoid trapping air bubbles. This may be, for example Owens-Corning #218, a melamine-treated glass. Into the mold over this facing layer, a layer of compatible body resin composition B is added.

This resin composition, where desired, may comprise a filler (by which word I mean to designate finely divided solids, including fibers 72 as well as pigments) well blended into the resin; or it may have a marbleized effect 60 obtained by reducing the blending time so as to leave an irregular distribution of the filler in the resin composition. After the desired effect has been achieved, the resin mix should be deaerated, e.g., by allowing to stand undisturbed at a moderate temperature until bubbles have substantially disappeared.

After the body resin composition B has been deaerated and a suitable layer formed on the mold, another reinforcing mat 72, e.g., a .75 oz. fiberglass mat "#218" or "Treatment #18" from Owens-Corning Fiberglas Corporation, is cut to fit in the mold pan and placed onto the layer of body resin B, the mat 72 soaking up the resin and settling into it slowly, so as not to fill the interstices before submerging them. Usually this settling period is one hour or other predetermined time, more or less, depending upon wettability of the glass in the resin composition and the viscosity of the resin composition in the temperature and humidity conditions at the time.

Concrete block 10 to be coated with the plastic layer is advantageously dressed or prepared by grinding true the face and edges of the block or otherwise preparing it by means, that are to be covered with plastic, as described and claimed in a copending application, Serial No. 514,661, filed June 10, 1955, now Patent No. 2,805,448. The block is taken, in a heated and dry condition, from a drying kiln, and is immediately placed with care in the prepared mold pan containing the resin composition, the temperature of the block not being reduced more than 15° F. before it is placed in the mold pan, advantageously at a temperature about 200–210° F., with the face of the block against the resin composition. The mold pan which may be heated with some of the formulations I use, and with the block in it is then advantageously placed in a press and pressure gradually applied. As stated in my copending application, this pressure may vary from 5 to 40 p.s.i. on the face of the block, dependent on the porosity of the block.

The lower platen of the press in contact with the mold pan may be maintained at a temperature of 250° F., ±10° F., the pressure and temperature being maintained for six minutes.

After this, the mold containing the block is removed to a post-cure oven for ½ hour, the temperature of the oven being 250° F., ±10° F.

After post-curing, the block is taken from the oven and removed from the mold, revealing a hard, smooth, decorative, plastic layer on the face of the concrete block.

In the drawings, I have shown standard, rectangular concrete blocks, but I use the term "block" herein broadly to mean bodies of massive form which, when combined with the plastic in accordance with my invention claimed in application Serial No. 498,715, filed April 1, 1955, constitute building units of whatever shapes or sizes which can be assembled on one another or on other types of building structures.

In Figure 1 and in Figures 3, 4, 5, a typical block 10 embodying the present invention is shown with a plastic layer comprising a fiberglass reinforcing mat. As shown in Figures 3, 4, 5, the glass fibers 75 close to the surface achieve a weblike pattern on the transparent or translucent resin 22, that may be observed through the outer pellucid layer 22 of the resin coating A against the background of pigmented body resin B–2, whereby an eye-pleasing effect is created.

If the resin composition used for the plastic layer comprises no pigment, the fiberglass mat 70 used as reinforcement may be silhouetted against the color of the concrete block, or the denser mat 73 of fiberglass behind.

Advantageously, the fibers of the reinforcing mat 70 are colorless, being visible only because of their light refraction and reflection. Thus the irregularly oriented fibers along the surface of the plastic and scratches on this surface are not readily distinguishable, but blend into the same infinitely variable weblike pattern. Thus the decorative surface is not seriously marred even when its finish is scratched. Although the diaphanous, fibrous web, i.e., mat 70 or 71 or 75 in the surface of the plastic does add reinforcement, its chief function is that of improving decorative appearance as herein set forth. The principal reinforcing in the plastic layer will ordinarily be performed by a heavier, more or less opaque mat 72 deeper below the plastic surface.

Materials other than fiberglass may be used as reinforcing agents and to develop the pattern in the surface of the plastic layer. Fine metallic wires 74 and synthetic 76 or natural fibers 77 and monofilaments achieve a pleasing result when used alone or in combinations with each other and/or fiberglass, e.g., the woof fibers being fiberglass fibers and the warp fibers being fine metallic wires, or e.g., the woof fibers being synthetic fibers and the warp fibers being natural fibers. Reinforcement such as steel mesh with a fixed pattern or weave may be used, and when placed in the plastic layer of resin, the fixed pattern may be discerned as a pleasing background.

Even without reinforcing fiber in the plastic layer, pleasing decorative effects may be obtained by use of pellucid plastic 79 and irregularly distributed filler 80. One such effect is shown in Figure 2. There a plastic layer 81 is depicted which is translucent and of varying optical density over the surface area of the plastic layer. This effect has been created by allowing a portion of the pigmented body resin 23 to blend into some of the transparent or highly pellucid translucent facing resin, thereby forming cloudlike areas in the facing. The cloudy areas limit visibility into the facing to lesser depths at the clouded areas than at the areas where the body resin has not mingled into the facing resin.

To achieve this effect, I advantageously make use of the structures and methods set forth in my copending applications. A mold pan 20 is coated with a thin film of transparent or highly translucent polyester resin 21 and the resin is allowed to gel in the same manner as I have described above in discussing plastic layers comprising reinforcing fibers, but using care that it is not cured beyond the stage at which integration with the later applied layer would be impaired. Into the mold pan and onto the facing film, a compatible body resin composition is poured, said resin composition comprising a filler pigment 14 systematically or irregularly distributed throughout the body resin mix. Since the facing film resin has gelled somewhat, the compatible body resin will only mingle with the adjacent areas of the facing film to a limited degree and to different intensities over the various portions of the facing film.

Before the body resin composition mix is placed in the mold pan 20, it should be allowed to stand undisturbed at a moderate temperature for a period of time sufficient to permit de-aeration of the mix.

The concrete block to be coated with the plastic layer is advantageously prepared by grinding true or otherwise dressing or preparing the faces of the block that are to be covered with plastic, as described and claimed in my copending application Serial No. 514,661, filed June 10, 1955. The heated and dry block is taken from a drying kiln and immediately or at a later time designed to provide a lower temperature than that when taken from the drying kiln or other drying means placed on the prepared mold pan containing the resin composition. When the block has been placed in the mold pan, it is pressed and post-cured as I have set forth above and as described and claimed in my copending application, Serial No. 498,715, filed April 1, 1955.

When the completely treated block is removed from the mold pan, a hard, smooth, decorative, plastic layer on the face of the concrete block is revealed, having an appearance like polished marble, granite or onyx, etc.

Among other resins, setting resins which may be used in place of the polyester resins are alkyd resins; silicone resins, for example catalyzed Dow-Corning #2106; epoxy resins 31; polyurethanes; phenol aldehyde resins diluted if necessary with a suitable solvent to a predetermined viscosity; and amino aldehyde resins; diluted if necessary to a suitable viscosity. Also, various other types of polyester resins can be used, among them those containing tri-allyl cyanurate to give heat resistance, fire-resistant chlorinated polyesters 33, for example, those sold under the name of "Hetron" by Hooker Electro-Chemical Company, e.g., Hetron #92 or Hetron #93 LS, Hetron 32A, Hetron 31, Hetron X-42. Thermoplastic resins can also be used where no more than moderate heat resistance is required. Thus, polymers and copolymers of vinyl chloride, other vinyl resins, polystyrene, polyamide resins, especially nylons, and polyfluoro ethylene resins, especially Teflon polytetrafluroethylene and Kel-F polymonochlorotrifluroethylene. Numerous other resins now known and which are continually being developed may be used in like manner; and combinations of compatible resins may likewise be used, as will be understood by those skilled in the art from the foregoing disclosure.

A beautiful surface appearance on the plastic may also be obtained by varying the depth of the pellucid facing layer. This uneven depth gives varying degrees of optical density so that visibility extends to different depths over the surface of the plastic layer of the structural member. This variance in visibility backed up by the pigmented body resin gives a very pleasing decorative appearance to the plastic layer. By using a body resin into which a pigment has not been fully blended, a mottled or variegated effect is enhanced.

While I have described a plastic layer with varying degrees of optical density over the surface area of the plastic layer without including a reinforcing material in the plastic layer, such reinforcement may be added, if desired, achieving a combination of the effects I have depicted in Figures 1 and 2.

Another example of my invention is a decorative structural member comprising a plastic layer with the pleasing distinct finish shown in Figure 2 and Figure 5 and reinforced with fiber glass, but with greatly reduced discernibleness of the weblike pattern in the surface coating that normally results from the use of melamine treated fiber glass reinforcement such as Owens-Corning Fiberglas Corp., "Treatment #218" in the plastic layer. Fiberglass treated with different coatings provides variations in the discernibleness of the web-like pattern or lack of it, e.g., melamine resin treated fiberglass like Owens-Corning Fiberglas Treatment #218 provides a high degree of "discernibleness" while their Treatment #216, a polyester resin binder treatment, provides a low or very little "discernibleness" when used in balanced design with the refractive index of the plastic resin then being used. This is accomplished by using a facing resin composition with a refractive index closely approaching the 1.548 refractive index of glass. Such a resin composition, for example, is an unsaturated polyester type resin containing methyl methacrylate blended with monomeric styrene or vinyl toluene, the preferred mixture of said resin composition being eighty parts by weight of the polyester resin and twenty parts by weight of the monomer in each one hundred parts by weight of the resin composition. This ratio of eighty to twenty may be varied and the amount of monomer may be as high as twenty-five parts by weight and as low as ten parts in each one hundred parts by weight of the resin composition. However, the ratio of eighty to twenty gives the optimum results.

In this example, using this resin composition which has a refractive index approaching that of glass, I advantageously spray a mold pan 20 with the resin composition. A loose mat of uncoated fiber glass reinforcement, e.g., Bigelow Sanford's, or one having resin-soluble coating, e.g., Owens-Corning #216, is settled and/or worked into the facing film. After this, a compatible body resin composition 25 is formed onto the facing film, the rate and direction of flow being regulated in view of the fluidity or condition of gel of the facing resin to give a desired irregularity of blending with, and/or distortion of, the transparent facing layer. Said body resin composition, comprising a filler, and/or pigment systematically or irregularly distributed throughout the body resin-mix 25, may be as desired in the range from opaque to translucent. Since, in this embodiment, the fiber mat 87 (which is invisible in the transparent resin) provides a penetrable barrier to mixing of the body mix into the facing layer, it is advantageous to apply the body mix as soon as the fiber mat has been incorporated into the facing resin layer, without waiting for the resin to gel.

A heated and dry concrete block 10 is then placed into the pan and on the resin. The mold pan with the block in it is placed in a press and after pressing until the resin has hardened on the face of the block, the mold pan with the block in it is removed from the press and the pan stripped from the molded block. The block for certain formulations when required is then placed in an oven and post-cured. All of the above is performed advantageously in a manner I have set forth elsewhere in this specification and described and claimed in my copending applications.

When the block is taken from the pan directly, or from the post-curing oven and removed from the mold pan, a distinctive, pleasing surface finish with cloudlike effects is revealed, but the weblike pattern of the fiber glass reinforcing mat does not appear at the surface of the facing layer.

Another example of my invention comprises the plastic layer reinforced with fiberglass which is first applied, molded and cured on the block as set forth in my copending application, Serial No. 498,715, filed April 1, 1955, and this layer may be covered with a thin, dense film of epoxy resin.

A considerable number of epoxy resin coatings are available from various sources. Thus, I may use the resin sold commercially by Shell Chemical Corporation under the designation Epon 1001, a typical commercial epoxy resin having a melting point ° C. (Duran) 64–76, color 25° C. (Gardner) 8 (max), epoxide equivalent 450–525, average molecular weight 900–1,000 and viscosity at 25° C. centipoises or Gardner-Holdt C-G. Epon 1001 as a typical epoxy resin can be used and is used with or without a few percent of modifying resin, as a flow control agent used to reduce surface tension and improve leveling, e.g., known materials like polyvinyl butyrate, certain silicones and certain ureas, such, for example, as American Cyanamid Company's Beetle Resin 216-8, and with ethylene diamine to accelerate setting of the resin. This may be dissolved in a mixture of methyl butyl ketone 45%, butyl Cellosolve 5%, and toluene 50%, by weight, to give a consistency suitable for application, and a uniform film formed on the surface by spraying or brushing or flowing and spreading by other known means. Depending upon the particular composition chosen, the film is cured at room temperature or by baking to a hard, dry, glossy film. Instead of ethylene diamine, a polyamide may be used with the epoxy as recommended in a paper by Peerman, Floyd and Mitchell (paper #10, page 17P, Abstracts of Papers, 128th meeting, American Chemical Society, September 1955).

Using an epoxy coating material sold commercially under the name of Hysil #6101, a light amber colored epoxy baking-type resin by Houghton Laboratories, the liquid is applied to form a thin film and dried at a temperature in the range 110°–120° C. for 5–15 minutes, the longer times for thicker films and the lower temperatures in the stated range, using Husol #6111, a light amber epoxy air-dry and baking type epoxy resin composition having a thinner, e.g., Hysol #618 and activate Hysol (F-1). This mixture has a working time of 5–20 hours and will cure at room temperature with excellent adhesion to e.g., concrete, metal, glass, wood and plastic surfaces. A packaged Hysol #6111 will provide a one coat thickness of 5 to 7 mils or it can be thinned 10–20% for brush application or 20–30% for application by dip or spray. At the following temperatures the length of cure is as follows:

Room temperature, e.g., 70° F. will set hard hard in 12 hours and cure completely in 7 days.

At 140° F. will cure in 90 minutes, or in 30 minutes at 140° F. plus 24 hours at room temperature.

At 300° F.—will cure in 7 minutes.

At 400° F.—will cure in 2 minutes.

The part can be handled in 6–8 hours after coating in using a room cure. The above is known information published in Houghton Laboratories, Inc., of Olean, N.Y., catalog releases.

If greater thickness of film is desired, a second film may be applied on the first when dried but not yet cured. The second film is then dried like the first, and in any case, the single or multiple film is cured by heating to 250° C. for 10 minutes.

In another example, in the same manner, the epoxy resin film may be applied to the mold after treating it with a silicone oil mold release agent, such as Dow Corning DC-7. The film is dried by heating to 110°–120° C. for 5–15 minutes as above, but is not fully cured until the heavier plastic layer is applied over it and the block is pressed on and in.

The heavier layer in this example is composed of an epoxide coating, potting or laminating composition, e.g., Houghton Labortories, Hysol #6103, or Shell Chemical Corp. Epon Resin Formulation XA–200 or Ciba Co., Inc., Aralidite CN–501 melted and mixed with a hardener as recommended by the manufacturer of the particular resin used, and with up to 300% by weight of fine particle filler such as silica pigment or fine sand, micronized alumina, etc. This composition while in liquid, flowable condition, is poured onto the coated mold pan to a thickness of about ⅛".

A piece of fiberglass mat cut to a size slightly less than the pan and preheated to the temperature of the liquid resin is laid onto this liquid resin composition and left to settle into it, as in prior examples. When the glass fabric is substantially entirely saturated and submerged, and without or with addition of a thin layer of the liquid resin composition onto the fabric or the face of the block, or a concrete block preheated to the temperature of the liquid resin is lowered onto the material in the mold pan and the material is then heated further while the block is pressed down against the mold, until the resin is set. This may be in the temperature range of 130° C.–250° C., the time being greater for lower temperatures and relatively short if the higher temperatures are used. Final cure after setting may be attained in the press or by storing at elevated temperatures after removal from the press. Thus after 10 minutes in the press at 250° C., the blocks may be piled in a closed room and left without other heating than that retained by the blocks themselves.

If solvent is used in the composition, it should be dried at a lower temperature before raising to the setting temperature.

Other resins and resin compositions which may be used for the coating film include phenol aldehyde type resins, alkyd type resins, and in general all those resins which are compatible with the resin used for the thicker facing layer which are known to be suitable for formulation of tough resistant surface coatings. Formulations which are now used for lacquering automobiles and other equipment exposed to weather may be used in this way.

Although I have indicated above that the film applied to the mold is substantially pure resin and I have found it advantageous because of the greater ease with which the film may be kept free from bubbles, pinholes, etc., and greater facility for visual inspection for the presence of such bubbles or pinholes, nevertheless the invention may be practiced with a pigmented film or one containing finely divided filler, especially if it is treated to remove all entrapped gases, e.g., by passing through a roller mill in a vacuum.

Other examples as shown by Figures 6, 7, 8, 11 and 12 of my invention is a decorative plastic layer comprising a special filler material 17 such as discrete particles of stone, glass, quartz, marble, onyx, colored sand, granite or the like. In preparing structural members with plastic layers containing these materials, the structures and methods I have described and claimed in my copending applications may advantageously be used. A thin, uniform film of a transparent or highly pellucid, translucent, polyester type resin composition 21 is sprayed on the surface of a mold pan 20 to form a facing film and allowed to partially gel. The special filler material 17 to be included in the plastic layer is spread over the gelled facing film. Next, a body resin mix 23 is sprayed into the pan, being careful not to agitate the filler material 17 or get the body mix 23 completely about the particles so that they would not be fully visible through the facing film of the plastic layer of the finished structural member.

When sufficient body resin 23 has been sprayed or otherwise placed into the mold pan to the desired depth, a mat of 2 oz. fiber glass 77, e.g., Treatment #216 or Treatment #219 e.g., #216 or "Treatment #16" from Owens-Corning Fiberglas Corp., cut to a size which can be fitted within the confines of the mold pan, is laid in the mold pan blanketing the layer of resin. The resin is allowed to permeate the mat in the manner I have set forth above in discussing the weblike pattern, decorative finish.

After this, a thoroughly dry concrete block, thoroughly dry to the depth required for plastic impregnation, and advantageously prepared by sawing or otherwise dressing or preparing or sawing or grinding true its face and adjacent edges that are to be covered with plastic, as described and claimed in my copending application, is placed into the mold onto the resin layer.

The mold with the concrete block in it is next placed in a press and advantageously treated as I have described and claimed in my copending applications and set forth elsewhere in this specification, except that the preferred pressure applied to the face of the block in this case is 20 p.s.i.

After curing, the block is removed from its mold, revealing a smooth, hard and unusually beautiful finished surface on the plastic layer.

When I desire a lamination of a substantially thick layer of decorative-structural plastic composition applied to concrete block or the like, which uses in its mixture aggregate particles of silica, or marble, or quartz, or onyx, or granite, or corundum, or in fact, any mineral filler 17 of desired structural properties or combinations thereof and of decorative effects and which sizes of aggregates up to e.g., ⅛" diameter or section, or even larger, and in which I can or cannot include graded smaller particles down to dust, or if desired combinations of specific sized aggregates are incorporated in specific mix designs, I advantageously apply the resin composition mixture upon the surfacing mat layer, e.g., .010 Owens-Corning Fiberglas Company surfacing mat in a quantity of body resin composition to make the desired cross section. The thick layer of body resin mixture as explained in my copending applications with its larger and smaller particles or its discrete sized particles dispersed in the resin mix offers to view in the completed member the variegated colors of such above named fillers, which decorative effects show from beneath the pellucid layer of the first spray applied layer of facing resin and through the e.g., 0.010 mil Owens-Corning type of Fiberglas surfacing mat.

If the benefits from fiber glass reinforcing are not wanted, the surfacing mat may be omitted. The pellucid layer sprayed directly into the mold takes its outer surface characteristics from the mold surface and certain plastic resins of my experience are very suitable without fiberglass reinforcement.

The specific gravity of filler materials also provide effects in that the heavier materials settle toward the molding face of the mold and appear superimposed against the background of lighter specific gravity fillers. I control the rate of fall out of the heavier particles by controlling the viscosity of the mixture of plastic resins and fillers as shown in my copending applications Serial No. 229,852, filed June 4, 1951, and Serial No. 498,715, filed April 1, 1955, and mentioned in some of my other copending applications.

When the viscosity characteristic of the body resin 23 is designed to provide a fairly stiff mixture, the "pattern effect" achieved can be made somewhat uniform when viewed through the pellucid layer. A very attractive "pattern effect" 37 can be made with a crushed red tufa rock screened e.g., through a 30 mesh Tyler screen and the 30 mesh sized material incorporated in a plastic resin such as Selectron 5051A or Paraplex 444 and in which a 200 screen mesh to 325 screen mesh white silica aggregate in a ratio of 40% 30 mesh red tufa is used to 60% white silica aggregate by volume forms the bulk of the filler. The red particles appear in the white silica as "peppered" random spaced particles. If a very white is desired I add titanium oxide white pigment to the desired whiteness. Such a body resin mixture can be used in fairly thick cross section e.g., 3/16" thick and on a thick transparent pellucid layer makes a very rich looking decorative structure.

The pellucid layer, i.e., the sprayed layer when applied to the mold and allowed to keep its transparent or translucent and transparent nature by pre-jelling, or by viscosity control as with Cabot-o-sil fine silica added to the mix, provides that aesthetic quantity and quality one envisions when one speaks of "depth," "softness," "silkiness" and the general qualities of "luxury feel." The surface characteristics in part provide the different "feels" by providing mat glaze, or high gloss, or medium gloss or dull gloss surfaces, all of which come from the mold surface. But these alone without "depth" or "softness" are not all I desire in this regard and find that specific aesthetic design requires selection of suitable desired qualities in the mold surface, in the resin characteristics, e.g., its refractive index, the fiber glass reinforcing or lack of it in specific parts of the design, and especially, in the selection and quantities of filler material. To one skilled in the art the selection of qualities and properties is routine, i.e., routine in the compounding of commonly selected fillers used in the reinforced plastics of common manufacture. I, however, have varied from and improved upon the filler characteristics used in my inventions by the use of larger sized particles of aggregates which I compound much like I compound ordinary concrete mixtures. Size and particle shape, surface permeability or impermeability of the particles, wetting characteristics, specific densities and gravities of the various types of particles, color and color stability under ultra-violet light or other rays, blending effects obtainable in various plastic resins and many other features and properties of the fillers, powders, aggregates and discrete particles I use find some of their best uses in my inventions when plastic resin compounds of my invention are placed against an outer pellucid layer through which the features designed are viewed.

The pellucid layer also has another feature which I take into account in specific designed formulations. The various plastic resins, catalysts and other materials used on exposed surfaces which result from the laying of a pellucid layer as the first member of a lamination or composition will show marked variation in their abilities to wear and weather. Atmospheric conditions vary in their effects on pellucid layers whether inside of structures or on outside exposures. These features of wearability of plastic resins are under constant research and evaluation and while resins such as Rohm and Haas, "Paraplex P-43," a 70% solution of unsaturated polyester in monomeric styrene or "Paraplex P-444," an almost water-white polyester-acrylic resin having excellent resistance to discoloration upon exposure to light and unusual resistance to erosion upon outdoor exposure or "Selectron 5051A" (as made by the Pittsburgh Plate Glass Co.,) an unsaturated polyester resin having excellent refractive index characteristics and excellent resistance to erosion upon outdoor exposure in this regard from tests, as of present knowledge, their features are subject to improvement, for specific end uses. In some respects these features are enhanced by the selection of the fillers used and I find that light rays for example penetrating through the pellucid layer and impinging upon the fillers underneath the pellucid layer could cause slow disintegration of the filler material. However, the pellucid layer serves a multi-purpose and in this application is stressed as a means of decorative value.

Generally, silica is not easily dissolved in acid and lends itself to acid resisting filler formulations. The carbonates are mostly translucent to transparent and are suitable as fillers in the pellucid layer if other properties are acceptable. None of the carbonates are very hard and all are more or less soluble in acid, freeing bubbles of carbon dioxide as they dissolve. The oxides and hydroxides have some very unlike minerals that can be grouped by like characteristics. Those that are very hard minerals since they are oxides are very resistant to change by the air's oxygen, i.e., to weathering. These minerals include some very heavy ore minerals with those that are free from water (anhydrous) are relatively hard. Some are often primary-minerals formed directly from molten rocks, as a melt, or from hot, watery (hydrothermal) solutions. Other oxides, those that form on the surface by weathering action in exposed locations and many of which contain water in addition, are generally found to be soft. When stained red, brown or black they are typical of iron and manganese oxide colors. The halides, nitrates and borates generally are light in color and usually water soluble. The sulphates contain both very soluble and rather insoluble mineral groups and all are soft with the pure ones mainly transparent or translucent. Hydrous calcium sulphates (gypsum) are extremely insoluble. The phosphates, arsenates and vanadates are all soft minerals and at times are found to be highly colored. The uranates, tungstates and molybdates are generally soft, heavy and individual members are found which are very colorful. Man made corundum is very hard and while generally considered only as black or white, is made in other colors. Using Moh's scale with the diamond as 10 each mineral falls into a ready hardness classification. By design, properties are selected from the various minerals to make specific formulations and the pellucid layer is vital to successful formulated properties in certain of the constructions of my inventions.

The above-described decorative and long-lasting surfaces are obviously not the limits of my invention. To anyone skilled in the art, modifications will undoubtedly occur which cannot be practiced without violating the scope and spirit of the following claims.

I claim:

1. A decorative structural member comprising, a supporting body of porous material having a surface composite layer on a face thereof, said layer including a bonding resin composition, a discrete filler, fibrous reinforcing and a pellucid resin composition; the exposed surface of said layer being smooth and rendering a plurality of distant subsurface portions of the layer visible to give a decorative surface effect, at least a portion of said body being penetrated, permeated and bonded by said bonding resin composition, said fibrous reinforcing comprising a mat substantially coextensive with said body face and embedded in the bonding resin composition, said pellucid resin composition having a diaphanous fibrous mat embedded therein and extendiing over the reinforcing mat and its bonding resin, said pellucid resin being transparent near its upper surface but becoming distinctly translucent at varying depths towards the face of the porous body and defining cloudy portions visible at different depths in the said composite layer to provide said subsurface portions.

2. A decorative structural member as defined in claim 1 in which said filler is opaque and irregularly distributed in the pellucid resin composition, said filler defining at least a portion of said cloudy portions to render varying optical density within said layer.

3. A decorative structural member as defined in claim 1 in which the pellucid resin composition is colored and the filler is white and said filler being irregularly distributed throughc parts of said composite layer.

4. A decorative structural member as defined in claim 1 in which the surface composite layer comprises at least two colors distributed through said composite layer whereby predetermined patterns are achieved.

5. A decorative structural member as defined in claim 1 in which the fibers of the mat in the said bonding resin composition are irregularly oriented to each other.

6. A decorative structural member as defined in claim 1 in which the fibers of the mat in the pellucid resin composition are irregularly oriented and an irregular cloud of pigment in the pellucid resin composition extends into said mat.

7. A decorative structural member as defined in claim 1 in which the fibers of the mat in the pellucid resin composition are irregularly oriented and an irregular cloud of pigment in the pellucid resin composition extends into said mat, the surface being substantially optically smooth.

8. A decorative structural member as defined in claim 1 in which the fibers of the reinforcing mat in the said bonding resin composition are irregularly oriented and a cloud of pigment extends into said reinforcing mat, the surface of said composite layer being substantially optically smooth, said composite layer being transparent for a limited depth greater than the topmost fibers of said reinforcing mat in said bonding resin composition, but less than the lowermost fibers therein.

9. A decorative structural member as defined in claim 1 in which said filler in said surface composite layer comprises a variety of chips of minerals embedded in the pellucid resin composition.

10. A decorative structural member as defined in claim 1 in which the fibers of the said bonding resin composition are visible at the surface in a weblike pattern and said fibers being of such a different index of refraction from the pellucid resin composition that they are similar in appearance to surface scratches.

11. A decorative structural member as defined in claim 1 in which the fibers of the said bonding resin composition are designedly oriented toward the surface of the said surface composite layer and a cloud of pigment in a transparent resin extends from the surface of said composite layer into said fibers, said transparent resin having a refractive index closely approaching the refractive index of the said fibers, said surface being substantially optically smooth.

12. A decorative structural member as defined in claim 1 in which said pellucid resin composition includes an unsaturated polyester resin composition containing methyl methacrylate and said filler comprises discrete particles having color stability under light, said composition being substantially color stable and highly resistant to weathering.

13. A decorative structural member as defined in claim 1 in which the fibers of the reinforcing fibrous mat in said bonding resin composition comprises fibers in the woof being of a different material than fibers in the warp, said woven fibers when viewed through the said pellucid resin composition showing a distinct pattern of design.

14. A decorative structural member as defined in claim 1 in which said pellucid resin composition is an unsaturated polyester-type resin containing methyl methacrylate blended with monomeric styrene or vinyl toluene monomer.

15. A decorative structural member as defined in claim 1 in which said surface composite layer includes a polymerizable composition in which at least a portion of said polymerizable composition contains epoxy resin.

16. A decorative structural member as defined in claim 1 in which said filler comprises synthetic and natural fibers and monofilaments embedded in said surface composite layer.

17. A decorative structural member as defined in claim 1 in which said filler is comprised of heavier and lighter particles which appear in the cured finished product from the surface thereof, said heavier particles being superimposed against a background of the lighter particles, and said pellucid resin composition includes a discrete epoxy resin and a curing agent therefor, said epoxy resin and curing agent embedding at least a portion of said heavy particles.

18. A decorative structural member comprising a supporting body of porous material having a surface composite layer on a face thereof, said layer including a bonding resin composition, a discrete filler, fibrous reinforcing and a pellucid resin composition; the exposed surface of said layer being smooth and rendering a plurality of distinct subsurface portions of the layer visible to give a decorative surface effect, at least a portion of said body being penetrated, permeated and bonded by said bonding resin composition, said fibrous reinforcing comprising a mat substantially coextensive with said body face and embedded in the bonding resin composition, said pellucid resin composition extending over the reinforcing mat and its bonding resin composition, said pellucid resin composition being transparent near its upper surface but becoming distinctly translucent at varying depths towards the face of the porous body and defining cloudy portions visible at different depths in the said composite layer to provide said subsurface portions, said discrete filler comprising a composite mixture of mineral particles having varying specific gravities, the particles of the heavier specific gravity being disposed nearer the surface of the said composite layer than the particles of lesser specific gravity to provide the different particles in varied superimposed relations and thereby defining a varied appearance.

19. A decorative structural member as defined in claim 18 in which the said surface composite layer includes a thermosetting resin composition selected from the group of thermosetting resins consisting of polyester resins, unsaturated polyester resins, polyester resins containing tri-allyl cyanurate to give heat resistance, fire-resistant chlorinated polyester resins, alkyd resins, silicone resins, epoxy resins, polyurethanes, phenol aldehyde resins, amino aldehyde resins, unsaturated polyester-type resins containing methyl methacrylate blended with a member selected from the group consisting of styrene and vinyl monomer.

References Cited in the file of this patent

UNITED STATES PATENTS

| | | |
|---|---|---|
| 1,593,314 | Stevens et al. | July 20, 1926 |
| 1,793,666 | Baldwin | Feb. 24, 1931 |
| 1,953,337 | Carson | Apr. 3, 1934 |
| 2,176,837 | Ellis | Oct. 17, 1939 |
| 2,193,635 | Marshall | Mar. 12, 1940 |

(Other references on following page)

UNITED STATES PATENTS

| | | |
|---|---|---|
| 2,311,613 | Slayter | Feb. 16, 1943 |
| 2,378,801 | Sidell et al. | June 19, 1945 |
| 2,414,125 | Rheinfrank | Jan. 14, 1947 |
| 2,594,081 | Shlenker | Apr. 22, 1952 |
| 2,688,580 | Fingerhut | Sept. 7, 1954 |
| 2,718,829 | Seymour et al. | Sept. 27, 1955 |
| 2,750,319 | Sanders | June 12, 1956 |
| 2,751,775 | Sergovic | June 26, 1956 |
| 2,768,563 | Immerman | Oct. 30, 1956 |
| 2,805,448 | Rubenstein | Sept. 10, 1957 |
| 2,817,619 | Bickel et al. | Dec. 24, 1957 |
| 2,850,890 | Rubenstein | Sept. 9, 1958 |

FOREIGN PATENTS

| | | |
|---|---|---|
| 523,130 | Belgium | Mar. 29, 1954 |

OTHER REFERENCES

"Modern Plastics," pages 111–115; October 1947.
"Concrete"; pages 12 and 45; June 1949.
Modern Plastics, page 113, November 1950.